Sept. 21, 1948.    J. OTTMAR    2,449,858
BURNER SAFETY CONTROL SYSTEM
Filed April 21, 1945
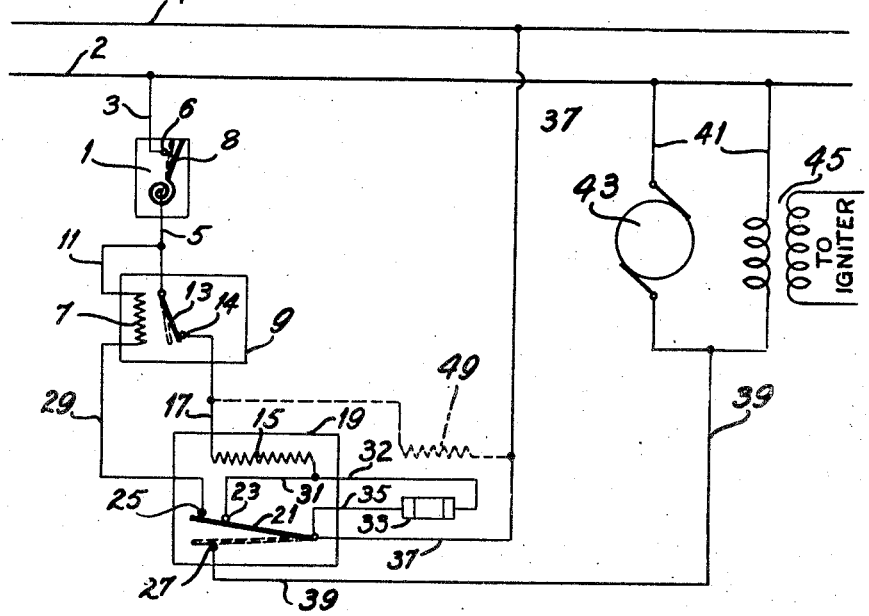
Jerome Ottmar
Inventor
Haynes and Koenig
Attorneys Patented Sept. 21, 1948

2,449,858

UNITED STATES PATENT OFFICE 2,449,858

BURNER SAFETY CONTROL SYSTEM

Jerome Ottmar, Attleboro, Mass., assignor to Metals & Controls Corporation, Attleboro, Mass., a corporation of Massachusetts Application April 21, 1945, Serial No. 589,567

2 Claims. (Cl. 158—28)

This invention relates to control circuits and more particularly to control circuits for burners.

Among the objects of the invention may be noted the provision of control circuits which control a burner without the necessity for subjecting a thermostatic control member to the burner temperature; a control circuit which does not utilize a magnetic relay; a control circuit which provides a safety shut-down by the operation of a unit which also acts as the control relay; a control circuit in which it is not necessary to re-cycle over the entire series of operations in all instances, so that it is not necessary in all events to await the passage of an entire scavenger period; a control circuit in which the safety shut-down timing is controlled by the off-time rather than by the on cycle; a burner control system which has few and inexpensive parts which may require replacement and which are readily accessible for repair and replacement; and, the provision of a control circuit in which the timing is only slightly affected by voltage variations. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing in which are illustrated several of various possible embodiments of the invention, Fig. 1 is a wiring diagram of a burner system; and, Fig. 2 is a wiring diagram of an alternative embodiment.

Similar reference characters indicate corresponding parts throughout the several views of the drawing.

In the interest of simplicity the present invention will be described as applied to the control of oil burners. It will be understood, however, that the control circuits of the present invention are equally applicable to the control of other burners, such as gas burners, coal burners, etc.

Referring now to Fig. 1 of the drawing, main power lines 2 and 4 provide a source of power. Connected to power line 2 by a wire 3 is a contact 6 of a main thermostatic control switch 1, of the type usually employed in the area to be heated by the burner. Such a control includes, in addition to contact 6, a thermally responsive member 8.

Connected to thermostatic member 8 by a wire 5 is the thermostatic control element 13 of a thermal relay safety switch 9. Thermal element 13 cooperates with a contact 14 when the former is in its solid line position, but does not meet contact 14 when it is in another position assumed in response to temperature change. A heater 7, for thermostatic element 13, is connected to wire 5 by wire 11. Safety switch A may be of the construction shown in Bolesky Patent 2,199,388 and is preferably of the manual reset type.

Contact 14 is connected by a wire 17 to the heater 15 of a thermostatic time-delay relay 19. Relay 19 is preferably of the type described in Wilson Patent 2,203,558, in which an ambient compensated control member operates a switch bar. Heater 15 is connected at its opposite side by wire 31 to a contact 23. A switch bar 21 cooperates with contact 23 in one position of the thermostatic elements of relay 19.

Heater 7 is connected at its opposite side by a wire 29 to a contact 25 which also cooperates with switch bar 21 when the latter is in its solid line position. When the thermostatic control elements of relay 19 snap to their other position in response to temperature change, they move switch bar 21 from its solid line position to its dotted line position, thereby separating bar 21 and contacts 23 and 25, and bringing bar 21 and contact 27 together.

Switch bar 21 is connected by a wire 37 to power line 4 and by a wire 35 to a flame-sensitive current controller 33, preferably of the type disclosed in Hower Patent 2,106,249. Current controller 33 is connected to heater 15 by a wire 32. Contact 27 is connected by a wire 39 to a parallel circuit 41 which includes the motor 43 of an oil burner pump, and the igniter 45 for said oil burner. Parallel circuit 41 is connected to power line 2.

The thermostatic element 8 of thermostatic switch 1 is shown in solid lines out of contact with contact 6. When, upon change of temperature, thermostatic element 8 moves to its dotted line position thereby meeting contact 6, a circuit is closed from power line 2 to wire 3, contact 6, thermostatic element 8, wire 5, thermostatic element 13, contact 14, wire 17, heater 15, wire 31, contact 23, switch bar 21, and wire 37 to power line 4. A parallel circuit is likewise closed from wire 5 to wire 11, heater 7, wire 29 and contact 25 to switch bar 21.

Current then passes through heaters 7 and 15 until heater 15 has transmitted sufficient heat to the thermostatic elements of relay 19 to cause these thermostatic elements to snap to their opposite position of curvature. This snap-action moves switch bar 21 from its solid line position to its dotted line position. Such movement opens the circuits above described at contacts 23 and 25, and closes a circuit from power line 2 to parallel wires 41, respectively to motor 43 and igniter 45, then to wire 39, contact 27, switch bar 21 and wire 37 to power line 4.

Under normal conditions this operation ignites the oil burner and the flame heats current controller 33 changing it from a condition of relatively low conductivity to a condition of relatively high conductivity. This permits current to flow around the open contact 23 so that a circuit from power line 2 to wire 3, contact 6, thermostatic element 8, wire 5, thermostatic element 13, contact 14, wire 17, heater 15, wire 32, current controller 33, wire 35 and wire 37 to power line 4 is closed.

Where flame-sensitive controller 33 is located in close proximity to the flame of the burner, the circuit last described is quickly established. However, if controller 33 is located at a substantial distance from the flame of the burner, as for example in the stack, a heater 49 is preferably provided for it as shown in dotted lines. Heater 49, it will be noted, is connected between wires 17 and 37 in shunt around relay 19.

Safety switch 9 and relay 19 are constructed so that heater 15 heats the thermostatic elements of relay 19 to snapping temperature before heater 7 heats thermostatic element 13 sufficiently for thermostat 13 to move from its solid line to its dotted line position.

Assume now that for some reason the igniter fails to ignite the oil burner after switch bar 21 of relay 19 has been moved from its solid line to its dotted line position. The circuit through the flame-sensitive current controller 33 is accordingly not established so that no current now passes to heater 15. Thereupon after a predetermined length of time the thermostatic control elements of relay 19 cool and snap back to their former position, thereby moving bar 21 from its dotted line to its solid line position. This reestablishes the two circuits first described above through contacts 23 and 25, current again passes to heater 15 and relay 19 re-cycles.

Safety switch 9 is preferably constructed so that relay 19 can go through its cycle twice in succession without the heater 7 sufficiently heating thermostat 13 so that the latter moves to its dotted line position. However, safety switch 9 is preferably constructed so that upon the third cycle of relay 19, the cumulative effect of the heat generated by heater 7 moves thermostatic member 13 from its solid line position to its dotted line position. This breaks the circuit to heater 15 and the thermostatic control elements of relay 19 cool until thermostatic element 13 is moved back to its solid line position. As stated above, safety switch 9 is preferably of the manual reset type, thereby requiring manual operation which will lead to investigation as to the cause of the extensive re-cycling.

Assuming now that the burner has started, it continues in operation until the heated area becomes warm enough so that thermostatic element 8 of thermostatic control 1 moves away from contact 6. In the meantime switch bar 21 is held in its dotted line position since, as pointed out above, current passes to heater 15 through controller 33. When thermostatic element 8 moves away from contact 6 the circuit to heater 15 is broken, so that after the predetermined cooling time interval of relay 19, the thermostatic control members thereof snap to their opposite position, moving contact bar 21 from contact 27 to contacts 23 and 25. The device is thereupon ready for a subsequent call for heat from the heated area.

Referring now to Fig. 2, a control circuit is illustrated which is basically similar to that shown in Fig. 1, but which employs a low voltage room thermostat and provides for intermittent ignition and also for longer scavenger periods than are afforded by the Fig. 1 control circuit. Power lines 2 and 4 are connected to opposite sides of a step-down transformer 51. One side of transformer 51 is connected by a wire 3 to contact 6 of room thermostat 1. Thermostatic member 8 of thermostat 1 is connected by a wire 53 to a contact 14 of a safety switch relay control 9. The thermostatic element 13 of switch 9 which cooperates with contact 14 is connected by a wire 55 to a switch bar 57 of a relay 59, similar to relay 19 of Fig. 1.

Transformer 51 is also connected by a wire 61 and a wire 63 to the heater 7 of safety switch 9. Transformer 51 is likewise connected by wire 61 to heater 15 of a relay 65, which also is similar to relay 19 of Fig. 1. Relay 65 includes switch bars 67 and 69 operated by the thermostatic control elements thereof. Switch bar 67 cooperates with contacts 71 and 73. Contacts 71 is connected by a wire 75 to the other end of heater 7, while contact 73 is connected by a wire 77 to current controller 33, the other end of which is connected by a wire 76 to wire 55.

Switch bar 67 is connected by a wire 81 to contact 83 in relay 59. Contact 83 cooperates with switch bar 57 when the latter is in its solid line position. Switch bar 69 is connected to a wire 85 to which is connected igniter 45 for the oil burner. Motor 43 is connected to wire 85 by wire 87 and to power line 4 by a wire 89.

Contact 91 in relay 65 cooperates with switch bar 69 when the latter is in its dotted line position. Contact 91 is connected to power line 2 by a wire 93. The heater 95 of relay 59 is connected at one side by wire 97 to wire 85 and at the other side by wire 99 to power line 4. Igniter 45 is connected at its other side by a wire 103 to a switch bar 101 of relay 59. Switch bar 101 in its solid line position cooperates with a contact 105 which is connected by a wire 107 to power line 4.

As in Fig. 1, if current controller 33 is located at a distance from the flame of the burner a heater 49 is preferably provided as shown in dotted lines.

The operation of the Fig. 2 device is as follows: Assume that room thermostat 1 calls for heat by thermostatic member 8 assuming its dotted line position thereby meeting contact 6. This closes a circuit from transformer 51 to wire 3, contact 6, thermostatic member 8, wire 53, contact 14, thermostatic member 13, wire 55, switch bar 57, contact 83, wire 81, switch bar 67, contact 73, wire 77, heater 15 and wire 61 to transformer 51. A circuit is also established from switch arm 67 to contact 71, wire 75, heater 7 and wire 63 to wire 61.

Heater 15 of relay 65 thereupon heats the thermostatic control elements of relay 65 until these thermostatic control elements snap to their position of opposite curvature. This snapping operation moves switch arms 67 and 69 to their dotted line positions. This opens the circuits above described at contacts 71 and 73 and brings switch bar 69 against contact 91. This last closes a circuit from power line 2 to wire 93, contact 91, switch arm 69, wire 85, wire 87, motor 43 and wire 89 to power line 4. Another circuit in parallel is established from wire 85 to igniter 45, wire 103, switch bar 101, contact 105 and wire 107 to power line 4. Closing these two circuits under normal conditions starts the motor 43 and ignites the oil burner. Assuming that combustion takes place in less time than the cooling time for the thermally responsive elements of relay 65, flame-sensitive current controller 33 is heated by the burner and becomes conductive, thereby establishing a circuit from transformer 51 through heater 15 which maintains the thermally responsive elements of relay 65 in their "hot" position, and thereby keeps switch arms 67 and 69 in their dotted line positions.

In the meantime moving switch arm 69 to its dotted line position has also closed a circuit from wire 85 to wire 97, heater 95, wire 99 and power line 4 so heater 95 is heating the thermally responsive elements of relay 59. After a predetermined time such thermally responsive elements are heated sufficiently to snap to their opposite positions, moving switch arms 57 and 101 to their dotted line positions. This breaks the circuit to the igniter at contact 105. This operation not only shuts down the spark, but also puts another break in the circuit which formerly included contact 71 and the one which formerly included contact 73.

As in the Fig. 1 construction, if the burner fails to ignite, current controller 33 does not become conducting, so that after the normal cooling time for the thermostatic control elements of relay 65 these control elements snap back to their previous position, moving switch arms 67 and 69 to their solid line positions. This recloses the first two circuits described for Fig. 2, and relay 65 re-cycles.

As in the Fig. 1 construction, safety switch 9 is constructed so that one cycle of relay 65 is not sufficient to heat thermostatic element 13 sufficiently to cause it to move to its dotted line position. Neither is a second cycle sufficient, but upon a third consecutive cycle of relay 65 heater 7 has heated thermostatic element 13 sufficiently so that the latter moves from its solid line to its dotted line position, thereby breaking the circuits which include contacts 71 and 73. Safety switch 9 is preferably constructed so as to require manual closing.

Assume now that the room has been heated sufficiently so that thermostat 1 is satisfied and thermal element 8 moves away from contact 6. This opens the circuit to heater 15 and after the normal cooling time for the thermostatic elements of relay 65 these control elements move switch bars 67 and 69 from their dotted line to their solid line positions. This opens the circuit to motor 43 and to heater 95. Thereupon the thermostatic control elements of relay 59 cool and after a predetermined time snap to their opposite position moving switch bars 57 and 101 from their dotted line to their solid line positions. The circuit is then ready for another cycle of the burner.

The control circuits of the present invention, it will be noted, utilize a flame-sensitive current controller which is less subject to damage from heat from the flame of the burner and which may be readily constructed so as to be easily replaced when the need arises. Such a circuit is less apt to get out of order than the customary circuits utilizing a friction clutch control.

Moreover, the circuits of the present invention use no magnetic relays and provide a safety shut-down from the same unit which acts as the control relay and which carries the motor and ignition circuits.

In the conventional type of burner relay control system there is a holding circuit which holds the magnetic relay in, and once it drops out the circuit goes through its entire scavenger period and re-cycle of the control before the burner will start up again. With the control circuits of the present invention, if the burner re-ignites before the thermostatic control elements of the relay snap to their cold position, the flame of the burner re-establishes the circuit through the heater of the relay and the relay does not re-cycle.

The circuits of the present invention depend on the "off" timing of the thermal relay for safety shut-down timing rather than the "on" cycle, and it has been found that voltage variations cause relatively little variation in the length of the "off" cycle. This is not true of the "on" cycle, so that the circuits utilizing the on cycle for shut-down timing are found to vary substantially in operating time, depending on voltage variation.

Another advantage of utilizing the breaking of a contact for safety shut-down rather than making a contact is that contact failure will not give an unsafe failure in burner operation. If the flame-sensitive current controller 33, for example, should fail it will fail in the open position and this will cause the relay to re-cycle one or two times until the safety switch shuts it off.

Moreover, by designing the current-controller 33 as a cartridge the entire unit may be mounted on the burner at the factory. Yet the controller 33 may be easily checked for failure or inexpensively replaced periodically to avoid failure. The entire control thereby need not be taken off and returned to the factory for repair.

It will be understood that the above circuits are typical and not exhaustive. For example, another relay may be inserted to obtain delayed oil valve operation where this is desired.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

I claim:

1. A burner control system comprising electrically actuated means for controlling the operation of a burner, an electrical igniter for the burner, said means and said igniter being connected in a power circuit under control of a thermostatic time-delay relay, said relay comprising a heater and contactor means movable in response to energization of the heater from a normal first position wherein said contactor means opens said power circuit to a second position wherein it closes said power circuit, a control circuit including said heater, a main control switch, and a safety switch in series, said contactor means including first contacts in said control circuit and closed by said contactor means when in its first position, a normally non-conductive flame-sensitive current controller adapted to become conductive in response to ignition of the burner, a circuit shunting said first contacts and including said controller, said controller being adapted when conductive to complete said control circuit through said main control switch, safety switch and heater independently of said contactor means, whereby said heater remains energized to hold said contactor means in its power-circuit-closing second position during operation of the burner, and a circuit including a heater for said safety switch and second contacts which are closed when the contactor means is in its first position, otherwise being open, said safety switch being adapted to open and break said control circuit when its heater is energized a predetermined number of times upon a predetermined number of operations of the relay without ignition of the burner.

2. A burner control system as set forth in claim 1, further including a second thermostatic time-delay relay for controlling said igniter, said second relay comprising a heater and contactor means movable in response to energization of the heater to deenergize said igniter, and a circuit including said second relay heater and third contacts closed in response to movement of the first-mentioned contactor means to its second position to energize said second relay heater and thereby deenergize said igniter after a predetermined time interval.

JEROME OTTMAR.

REFERENCES CITED

The following references are of record in the file of this patent:

UNITED STATES PATENTS

| Number | Name | Date |
|---|---|---|
| Re. 18,771 | Phelan | Mar. 21, 1933 |
| 2,045,821 | Austin | June 30, 1936 |
| 2,057,383 | Kroger | Oct. 13, 1936 |
| 2,159,658 | Hall | May 23, 1939 |
| 2,255,672 | Mason | Sept. 9, 1941 |
| 2,269,443 | Deubel | Jan. 13, 1942 |